US009780923B2

United States Patent
Noh et al.

(10) Patent No.: US 9,780,923 B2
(45) Date of Patent: Oct. 3, 2017

(54) METHOD AND APPARATUS FOR ACK TRANSMISSION IN A WLAN

(75) Inventors: Yu Jin Noh, Anyang-si (KR); Dae Won Lee, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

(21) Appl. No.: 13/578,867

(22) PCT Filed: Jul. 27, 2010

(86) PCT No.: PCT/KR2010/004900
§ 371 (c)(1),
(2), (4) Date: Aug. 14, 2012

(87) PCT Pub. No.: WO2011/102575
PCT Pub. Date: Aug. 25, 2011

(65) Prior Publication Data
US 2012/0314697 A1    Dec. 13, 2012

Related U.S. Application Data

(60) Provisional application No. 61/305,548, filed on Feb. 18, 2010.

(30) Foreign Application Priority Data

May 31, 2010    (KR) .................. 10-2010-0050758

(51) Int. Cl.
*H04L 1/16* (2006.01)
*H04L 1/00* (2006.01)

(52) U.S. Cl.
CPC .......... *H04L 1/1628* (2013.01); *H04L 1/1614* (2013.01); *H04L 2001/0093* (2013.01)

(58) Field of Classification Search
CPC ..... H04L 1/1628; H04L 1/1614; H04W 28/04
(Continued)

(56) References Cited

U.S. PATENT DOCUMENTS 7,599,363 B2 * 10/2009 Jang et al. .................... 370/389
7,869,418 B2 *  1/2011 Nishibayashi et al. ....... 370/349
(Continued)

FOREIGN PATENT DOCUMENTS

KR       10-0567821       4/2006
KR   10-2007-0073565      7/2007
(Continued)

OTHER PUBLICATIONS

Orlando Cabral et al., "Implementation of Multi-service IEEE 802.11e Block Acknowledgement Policies", IAENG International Journal of Computer Science, vol. 36, No. 1, Feb. 2009.
(Continued)

*Primary Examiner* — Jung Park
*Assistant Examiner* — Jamaal Henson
(74) *Attorney, Agent, or Firm* — Lee Hong Degerman Kang & Waimey

(57) ABSTRACT

The present invention relates to a method and apparatus for acknowledgement (ACK) transmission in a WLAN. A station receives a plurality of data frames from a plurality of other stations and then transmits an ACK for the plurality of data frames to the plurality of stations. The ACK is a multi-user (MU) block ACK frame which includes a plurality of block ACKs for the plurality of stations. One block ACK includes at least one ACK for at least one data frame that is received from one station.

8 Claims, 13 Drawing Sheets

(58) Field of Classification Search
USPC ....... 370/236, 338, 394, 428, 468, 473, 474; 714/748–749
See application file for complete search history.

(56) References Cited

U.S. PATENT DOCUMENTS

| | | | |
|---|---|---|---|
| 2003/0103521 A1* | 6/2003 | Raphaeli | H04B 3/542 370/445 |
| 2004/0205105 A1* | 10/2004 | Larsson | H04L 45/00 709/200 |
| 2005/0147023 A1* | 7/2005 | Stephens | H04B 7/0408 370/203 |
| 2005/0152358 A1* | 7/2005 | Giesberts | H04L 29/06 370/389 |
| 2005/0238016 A1* | 10/2005 | Nishibayashi et al. | 370/389 |
| 2006/0018332 A1* | 1/2006 | Kakani | H04L 1/1614 370/428 |
| 2006/0034247 A1* | 2/2006 | Gu | H04L 1/1628 370/349 |
| 2006/0034274 A1* | 2/2006 | Kakani | H04L 1/1829 370/389 |
| 2006/0034317 A1* | 2/2006 | Hong | H04L 1/1614 370/445 |
| 2006/0048034 A1* | 3/2006 | Cho | H04L 1/1614 714/749 |
| 2006/0195753 A1* | 8/2006 | Nam et al. | 714/749 |
| 2007/0153754 A1* | 7/2007 | Shapira | H04W 16/10 370/338 |
| 2007/0153760 A1* | 7/2007 | Shapira | H04B 7/2681 370/350 |
| 2007/0186134 A1* | 8/2007 | Singh et al. | 714/749 |
| 2007/0189207 A1* | 8/2007 | Sammour et al. | 370/328 |
| 2009/0046613 A1* | 2/2009 | Gaur | H04L 1/1829 370/312 |
| 2009/0046618 A1* | 2/2009 | Shiba | H04L 12/1868 370/312 |
| 2009/0086696 A1* | 4/2009 | Naito et al. | 370/338 |
| 2009/0196364 A1* | 8/2009 | Nakajima et al. | 375/260 |
| 2009/0238132 A1* | 9/2009 | Nabetani et al. | 370/329 |
| 2009/0238293 A1* | 9/2009 | Bhatti et al. | 375/260 |
| 2009/0292965 A1* | 11/2009 | Park et al. | 714/750 |
| 2010/0008318 A1* | 1/2010 | Wentink | H04W 74/006 370/329 |
| 2010/0046540 A1* | 2/2010 | Nishibayashi et al. | 370/445 |
| 2010/0054188 A1 | 3/2010 | Matsumoto et al. | |
| 2010/0080173 A1* | 4/2010 | Takagi | H04L 27/0006 370/328 |
| 2010/0189056 A1* | 7/2010 | Nishibayashi et al. | 370/329 |
| 2010/0226349 A1* | 9/2010 | Matsuo et al. | 370/338 |
| 2010/0266057 A1* | 10/2010 | Shrivastava et al. | 375/260 |
| 2010/0309834 A1* | 12/2010 | Fischer | H04B 7/0452 370/312 |
| 2010/0310003 A1* | 12/2010 | Lauer | H04L 27/2601 375/267 |
| 2010/0322166 A1* | 12/2010 | Sampath | H04W 72/121 370/329 |
| 2011/0096710 A1* | 4/2011 | Liu | H04L 1/1614 370/312 |
| 2011/0150004 A1* | 6/2011 | Denteneer | H04L 5/0023 370/476 |
| 2011/0286377 A1* | 11/2011 | Sampath | H04L 1/1671 370/312 |
| 2012/0014336 A1* | 1/2012 | Seok | 370/329 |

FOREIGN PATENT DOCUMENTS

| | | |
|---|---|---|
| WO | 2008093233 | 8/2008 |
| WO | 2008114510 | 9/2008 |
| WO | 2008153361 | 12/2008 |
| WO | 2009157901 | 12/2009 |

OTHER PUBLICATIONS

European Patent Office Application Serial No. 10846213.6, Search Report dated Jun. 30, 2017, 9 pages.

* cited by examiner

FIG. 7

| BA policy (751) | Multi-TID (752) | Compressed bitmap (753) | MU (754) | MU number (755) |

METHOD AND APPARATUS FOR ACK TRANSMISSION IN A WLAN

CROSS-REFERENCE TO RELATED APPLICATIONS

This application is the National Stage filing under 35 U.S.C. 371 of International Application No. PCT/KR2010/004900, filed on Jul. 27, 2010, which claims the benefit of earlier filing date and right of priority to Korean Application No. 10-2010-0050758, filed on May 31, 2010, and also claims the benefit of U.S. Provisional Application Ser. No. 61/305,548, filed on Feb. 18, 2010, the contents of which are all incorporated by reference herein in their entirety.

BACKGROUND OF THE INVENTION

Field of the Invention

The present invention relates to wireless communication and, more particularly, to a method and apparatus for transmitting acknowledgement (ACK) in a Wireless Local Area Network (WLAN) using multiple antennas.

Related Art

With the recent development of information communication technology, a variety of wireless communication techniques are being developed. From among them, a Wireless Local Area Network (WLAN) is a technique for wirelessly accessing the Internet at homes or companies or in specific service providing areas by using portable terminals, such as a Personal Digital Assistant (PDA), a laptop computer, and a Portable Multimedia Player (PMP), based on wireless frequency technology.

A lot of standardization tasks are being performed since Institute of Electrical and Electronics Engineering (IEEE) 802 (i.e., the standardization organization of WLAN technology) was established on February, 1980.

WLAN technology initially supported a speed of 1 to 2 Mbps through frequency hopping, band spreading, and infrared communication by using a frequency of 2.4 GHz according to IEEE 802.11, but recently may support a maximum speed of 54 Mbps by using Orthogonal Frequency Division Multiplexing (OFDM). In addition, in IEEE 802.11, standardizations for various techniques, such as the improvement of Quality of Service (QoS), Access Point (AP) protocol compatibility, security enhancement, radio resource measurement, wireless access vehicular environments, fast roaming, a mesh network, interworking with an external network, and wireless network management, are being put to practical use or developed.

IEEE 802.11b of IEEE 802.11 uses a frequency of 2.4 GHz band and also supports a maximum communication speed of 11 Mbs. IEEE 802.11a commercialized since IEEE 802.11b has reduced the influence of interference as compared with the frequency of a 2.4 GHz band by using a frequency of a 5 GHz band not the 2.4 GHz band that is very complex and has improved the communication speed to a maximum of 54 Mbps by using OFDM technology. However, IEEE 802.11a is disadvantageous in that it has a shorter communication distance than IEEE 802.11b. Furthermore, IEEE 802.11g embodies a maximum communication speed of 54 Mbps by using the frequency of 2.4 GHz band like IEEE 802.11b. IEEE 802.11g has been greatly in the spotlight because it satisfies backward compatibility, and it also has a better communication distance than IEEE 802.11a.

Furthermore, in order to overcome a limit to the communication speed that was considered as being weakness in a WLAN, IEEE 802.11n has recently been established as a technical standard. An object of IEEE 802.11n is to increase the speed and reliability of a network and to extend the coverage of a wireless network. More particularly, in order to support a High Throughput (HT) having a maximum data processing speed of 540 Mbps or higher, minimize an error in transmission, and optimize the data speed, IEEE 802.11n is based on Multiple Inputs and Multiple Outputs (MIMO) technology using multiple antennas on both sides of a transmitter and a receiver. Furthermore, this standard may use not only a coding scheme for transmitting several redundant copies in order to increase data reliability, but also Orthogonal Frequency Division Multiplex (OFDM) in order to increase the speed.

As the propagation of a WLAN is activated and applications using the WLAN are diversified, there is a need for a new WLAN system for supporting a throughput higher than the data processing speed supported by IEEE 802.11n. A Very High Throughput (VHT) WLAN system is one of IEEE 802.11 WLAN systems which are recently proposed in order to support a data processing speed of 1 Gbps or higher. The term 'VHT WLAN system' is arbitrary, and a feasibility test on a system using 8×8 MIMO and a channel bandwidth of 80 MHz or higher is in progress in order to provide the throughput of 1 Gbps or higher.

For more reliable data transmission, there is a scheme in which a receiver that has received a data frame from a transmitter transmits acknowledgement (ACK). The ACK is used as block ACK in a WLAN. For the block ACK, reference may be made to Paragraph 7.2.1 of "Part 11: Wireless LAN Medium Access Control (MAC) and Physical Layer (PHY) specifications, Amendment 5: Enhancements for Higher Throughput" of IEEE 802.11n/D11.0 disclosed on June, 2009. A transmitter transmits a plurality of data frames. A receiver transmits a block ACK frame to the transmitter as ACK to the plurality of data frames.

However, a VHT WLAN system adopts Multi-User (MU)-MIMO in which a plurality of stations (STAs) accesses a channel at the same time and exchanges frames with an AP in order to use the channel more efficiently. In a WLAN system supporting MU-MIMO, how the ACK frame, that is, ACK, will be transmitted may be problematic.

Conventional data frame transmission and an ACK frame in response to the data frame are based on condition that frames are exchanged between an AP and a single STA. If the conventional method is applied to a WLAN system supporting MU-MIMO without change, it may be inefficient.

SUMMARY OF THE INVENTION

An object of the present invention is to provide a method and apparatus for transmitting ACK in a WLAN system supporting multiple antennas.

In an aspect, there is provided a method of transmitting ACK in a WLAN. The method includes receiving a plurality of data frames from a plurality of stations (STAs) and transmitting ACK for the plurality of data frames to the plurality of STAs, wherein the ACK is a Multi-User (MU) block ACK frame including a plurality of block ACKs for the plurality of STAs, and one block ACK comprises at least one ACK for at least one data frame received from one STA.

The plurality of data frames may be simultaneously received from the plurality of STAs.

The MU block ACK frame may include a Block ACK (BA) control field comprising a BA policy subfield indicating whether the plurality of block ACKs has been transmitted or not, and a BA information field comprising the plurality of block ACKs.

The BA information field may include an End Of BA (EOB) indicating the end of each of the plurality of block ACKs.

The BA control field further may include a Multi-User (MU) BA order indicating order of the block ACKs for the plurality of STAs and MU BA duration indicating the size of each of the plurality of block ACKs.

The BA control field may further include a field indicating that a frame is an MU block ACK frame.

The BA control field may further include an MU number field indicating the number of the plurality of STAs.

The BA information field may further include an Association Identifier (AID) indicating the identifier of each of the plurality of STAs.

The MU block ACK frame may further include an additional BA field indicating whether there is subsequent block ACK or not.

In another aspect, a wireless apparatus transmitting acknowledgement (ACK) in a Wireless Local Area Network (WLAN) includes a transceiver receiving a plurality of data frames from a plurality of stations (STAs) and transmitting ACK for the plurality of data frames to the plurality of STAs, a data processor processing the plurality of data frames, and an ACK unit generating a Multi-User (MU) block ACK frame, including a plurality of block ACKs for the plurality of STAs, as the ACK, wherein one block ACK may include at least one ACK for at least one data frame received from one STA.

Although a plurality of STAs accesses a channel at the same time, ACK to the plurality of STAs can be transmitted. Accordingly, reliability of data transmission can be improved.

BRIEF DESCRIPTION OF THE DRAWINGS

FIG. 7 is a block diagram showing an example of a BA control field of the MU block ACK frame in accordance with an embodiment of the present invention.

DESCRIPTION OF EXEMPLARY EMBODIMENTS

Hereinafter, embodiments of the present invention are described in detail with reference to the accompanying drawings. In the following embodiments, a Very High Throughput (VHT) WLAN system operating in a frequency band of 6 GHz or lower may be usefully applied to the transmission of an ACK frame by an AP in response to uplink transmission in which a plurality of stations (STAs) transmits data frames to an AP at the same time. A VHT WLAN system is described below as an example, for convenience of description, but the technical spirit of the present invention is not limited thereto. The formats of an ACK frame, a method of transmitting an ACK frame, and an apparatus supporting the same that are proposed by the present invention may be likewise applied to WLAN systems operating in various frequency bands and other wireless communication systems.

Figure 1:
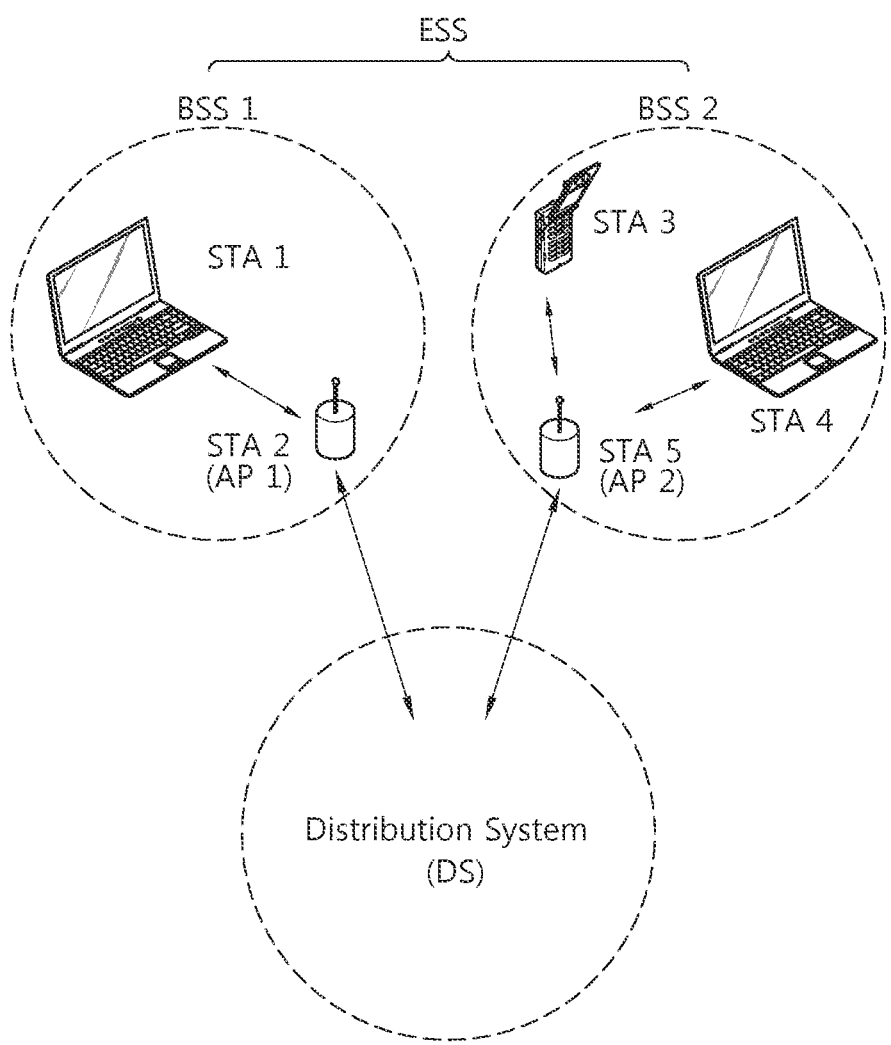
FIG. 1 is a diagram showing the configuration of a WLAN system to which an embodiment of the present invention may be applied.

FIG. 1 is a diagram showing the configuration of a Wireless Local Area Network (WLAN) system to which the embodiments of the present invention may be applied. The WLAN system according to an example shown in FIG. 1 is a Very High Throughput (VHT) WLAN system.

Referring to FIG. 1, the VHT WLAN system includes one or more Basic Service Sets (BSSs). The BSS is a set of stations (STAs) which can communicate with each other through successful synchronization, and it is not a concept indicating a specific area. Furthermore, a BSS supporting ultra-high data processing of 1 GHz or higher as in the WLAN systems to which the embodiments of the present invention may be applied is called a VHT BSS.

A VHT BSS may also be divided into an infrastructure BSS and an Independent BSS (IBSS). An infrastructure BSS is shown in FIG. 1. Infrastructure BSSs BSS1 and BSS2 include one or more non-AP STAs Non-AP STA1, Non-AP STA3, and Non-AP STA4, APs AP STA1 and AP STA2, that is, STAs providing distribution service, and a Distribution System (DS) coupling the plurality of APs AP STA1 and AP STA2. In the infrastructure BSS, an AP STA manages the non-AP STAs of the BSS.

In contrast, the IBSS is a BSS operating in an Ad-Hoc mode. The IBSS does not have a centralized management entity because it does not include an AP VHT STA. That is, in the IBSS, non-AP STAs are managed in a distributed manner. In the IBSS, all STAs may be mobile STAs, and they form a self-contained network because access to a DS is not allowed.

An STA is a specific functional medium, including Medium Access Control (MAC) according to the rules of the IEEE 802.11 standard and a physical layer interface for a wireless medium. In a broad sense, an STA includes both an AP and a non-AP STA. Furthermore, in a multi-channel environment, an STA supporting ultra-high data processing of 1 GHz or higher is also called a VHT STA. In a VHT WLAN system to which the embodiments of the present invention may be applied, STAs included in a BSS may be all VHT STAs, or they may include both VHT STAs and legacy STAs (e.g., an HT STA according to IEEE 802.11 a/b/g/n).

Portable terminals manipulated by users, from among STAs, are non-AP STAs (i.e., STA1, STA3, STA4, and STA5). When an STA is simply called, it also refers to a non-AP STA. The non-AP STA may also be called another terminology, such as a terminal, a Wireless Transmit/Receive Unit (WTRU), User Equipment (UE), a Mobile Station (MS), a mobile terminal, or a mobile subscriber unit. Furthermore, a non-AP STA which supports ultra-high data processing based on MU-MIMO technology may be called a non-AP VHT STA or simply a VHT STA.

Furthermore, the APs AP1 and AP2 are functional entities which provide access to the DS via a wireless medium for the STAs associated therewith. In an infrastructure BSS including an AP, communication between non-AP STAs is performed via the AP in principle, but the non-AP STAs may directly communicate with each other when a direct link is set up between the non-AP STAs. The AP may also be called a centralized controller, a Base Station (BS), a node-B, a Base Transceiver System (BTS), or a site controller in addition to an access point. Furthermore, an AP supporting ultra-high data processing based on MU-MIMO technology to be described later is called a VHT AP.

A plurality of infrastructure BSSs may be interconnected through a Distribution System (DS). The plurality of BSSs coupled through the DS is called an Extended Service Set (ESS). STAs included in the ESS can communicate with each other, and a non-AP STA can move from one BSS to another BSS within the same ESS.

The DS is a mechanism for enabling one AP to communicate with another AP. In accordance with this mechanism, an AP may transmit a frame for STAs associated with a BSS managed by the AP, or if any one STA has moved to another BSS, the AP may transfer a frame or may transfer a frame to an external network, such as a wired network. The DS does not need to be necessarily a network, but may have any form as long as it can provide specific distribution service defined in IEEE 802.11. For example, the DS may be a wireless network, such as a mesh network, or may be a physical structure for coupling APs.

Figure 2:
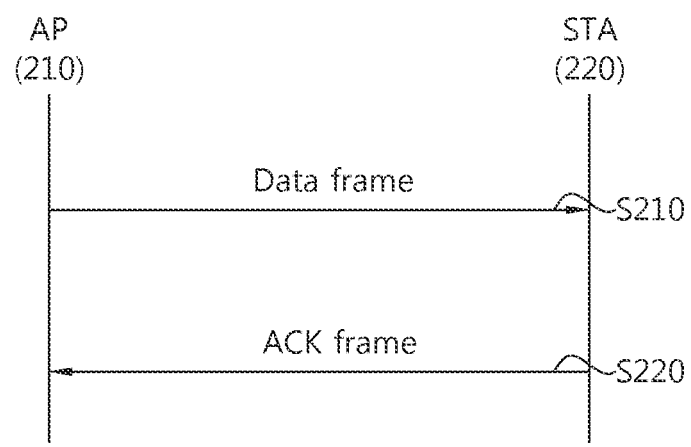
FIG. 2 is a flowchart illustrating an example the exchange of a data frame and an ACK frame between an AP and an STA in a WLAN system.

FIG. 2 is a flowchart illustrating an example the exchange of a data frame and an ACK frame between an AP and an STA in a WLAN system.

Referring to FIG. 2, an STA 220 receives a data frame from an AP 210 (S210). The STA 220 transmits an ACK frame to the AP 210 as ACK to the data frame (S220). If the STA 220 does not receive the data frame normally, it cannot transmit the ACK frame. If the ACK frame is not received from the STA 220 after a lapse of some time (e.g. a Short InterFrame Space (SIFS)), the AP 210 considers that the transmission of the data frame is failed and may retransmit the data frame. The number of times that the data frame is retried may be determined by a retry limit. If the data frame is not successfully transmitted until the retry limit is exceeded, the AP 210 discards the data frame. To transmit the ACK frame as an ACK response is to enhance the transmission reliability of the data frame. However, the ACK frame does not need to be always transmitted as a respond to all data frames. The STA 220 may not transmit the ACK frame in response to the multi-cast data frame or broadcast data frame of the AP 210.

Figure 3:
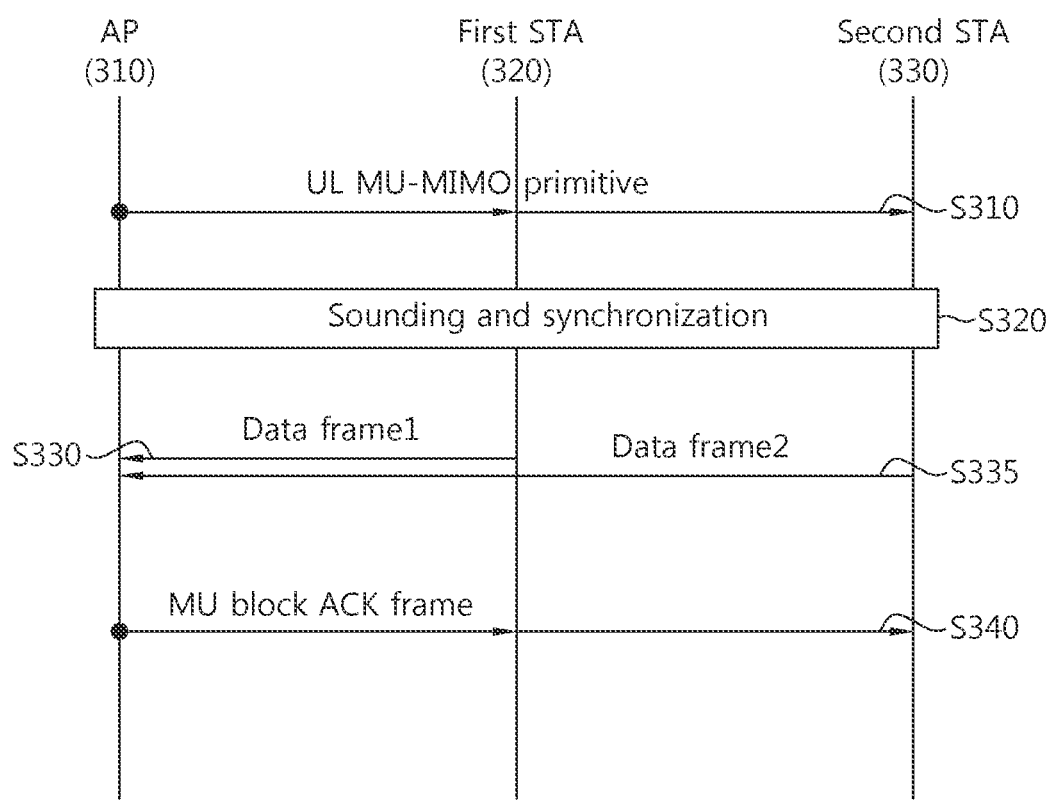
FIG. 3 is a flowchart illustrating an example in which a data frame and an ACK frame are exchanged in Uplink (UL) MU-MIMO in accordance with an embodiment of the present invention.

FIG. 3 is a flowchart illustrating a method of exchanging a data frame and an ACK frame in UL MU-MIMO in accordance with an embodiment of the present invention.

Referring to FIG. 3, an AP 310 transmits an UL MU-MIMO primitive 315 to a first STA 320 and a second STA 330 (S310). The UL MU-MIMO primitive includes configuration information for UL MU-MIMO transmission to STAs within a BSS. The UL MU-MIMO primitive may be transmitted through a newly defined management frame or may be included in the conventional management frame or control frame of the IEEE 802.11 standard and then transmitted. The UL MU-MIMO primitive may be broadcasted or may be unicasted to each of STAs that will participate in UL MU-MIMO transmission depending on embodiments.

The UL MU-MIMO primitive may include at least one of information indicating a pairing STA that will participate in UL MU-MIMO, a control signal that requests a sounding frame for sounding to be transmitted, and information about duration where UL MU-MIMO transmission is performed. STAs within a BSS may check whether they are STAs corresponding to the subject of participation in UL MU-MIMO transmission and may transmit sounding frames for channel estimation if, as a result of the check, they belong to the subject of participation. If an STA that has received the UL MU-MIMO primitive checks that it does not correspond to the subject of participation in UL MU-MIMO transmission, the STA may defer channel access for duration where the UL MU-MIMO transmission is performed by setting a Network Allocation Vector (NAV) based on information about the duration where the UL MU-MIMO transmission is performed and which is included in the UL MU-MIMO primitive.

In the example of FIG. 3, the first STA 320 and the second STA 330 corresponding to the subject of participation in UL MU-MIMO transmission are prepared for subsequent UL MU-MIMO transmission by performing procedures, such as sounding and synchronization, (S320).

The first STA 320 transmits a data frame1 to the AP 310 (S330) and, at the same time, the second STA 330 transmits a data frame2 to the AP 310 (S335).

When the data frame1 and the data frame2 are received from the first STA 320 and the second STA 330, the AP 310 transmits a Multi-User (MU) block ACK frame to the first STA 320 and the second STA 330 as an ACK response thereto (S340). The MU block ACK frame is formed by gathering ACKs for the plurality of data frames received from the plurality of STAs.

In accordance with an embodiment of the present invention, an AP that has received data frames according to UL MIMO transmission from a plurality of STAs may transmit an MU block ACK frame to the plurality of STAs at the same time without additional scheduling.

In accordance with the existing block ACK structure, a block ACK frame includes at least one ACK for one STA. In contrast, the proposed MU block ACK frame includes a plurality of ACKs for a plurality of STAs.

The MU block ACK frame includes ACKs for a plurality of STAs that have transmitted data frames to an AP through UL MU-MIMO. Accordingly, if the format of the conventional block ACK frame transmitted to a single STA is used without change, it is impossible to know that a plurality of ACKs included in an MU block ACK frame is ACK for which one of the plurality of STAs. In other words, each of the plurality of STAs does not know that what ACK or BA has been intended to be transmitted thereto even though each STA receives the MU block ACK frame. This problem may be solved if each STA knows Block ACK (BA) order information, that is, information about the arrangement of ACK corresponding to each STA within an MU block ACK frame.

Each STA may previously know the position or order of its own ACK within an MU block ACK frame. For example, before the MU block ACK frame is transmitted, the first ACK might have been designated as ACK for the first STA 320 and the second ACK might have been designated as ACK for the second STA 330.

An AP may use various methods in order to inform a plurality of STAs of BA order information in advance. In an embodiment, block ACK order information may be included in an UL MU-MIMO primitive. In another embodiment, in order to perform sounding for estimating a channel for MU-MIMO transmission, block ACK order information may be included in a training request (TRQ) transmitted by an AP. The AP designates order of sounding transmission for each STA through the TRQ. The order of sounding transmission may be used as a block ACK order without change.

An MU block ACK frame may include block ACK order information. This is described later in relation to the size of block ACK for each STA within an MU block ACK frame.

Each STA may transmit one or more data frames. It is assumed that the first STA 320 transmits two data frames and the second STA 330 transmits three data frames. An MU block ACK frame includes block ACK (i.e., ACKs for the two data frames) for the first STA 320 and block ACK (i.e., ACKs for the three data frames) for the second STA 330. It is also assumed that a block ACK order is the first STA 320 and the second STA 330. Here, the second STA 330 that has received the MU block ACK frame must know the size of the block ACK of the first STA 320 in order to obtain its own block ACK. The size of the block ACK is identical with the number of ACKs for one STA or the number of received data frames for one STA. The size of the block ACK may also be called block ACK duration.

Accordingly, each STA can obtain its own block ACK only when the STA knows the size of the block ACK of another STA that is included in an MU block ACK frame, in addition to block ACK order information.

The formats of proposed MU block ACK frames are described in detail below.

Figure 4:
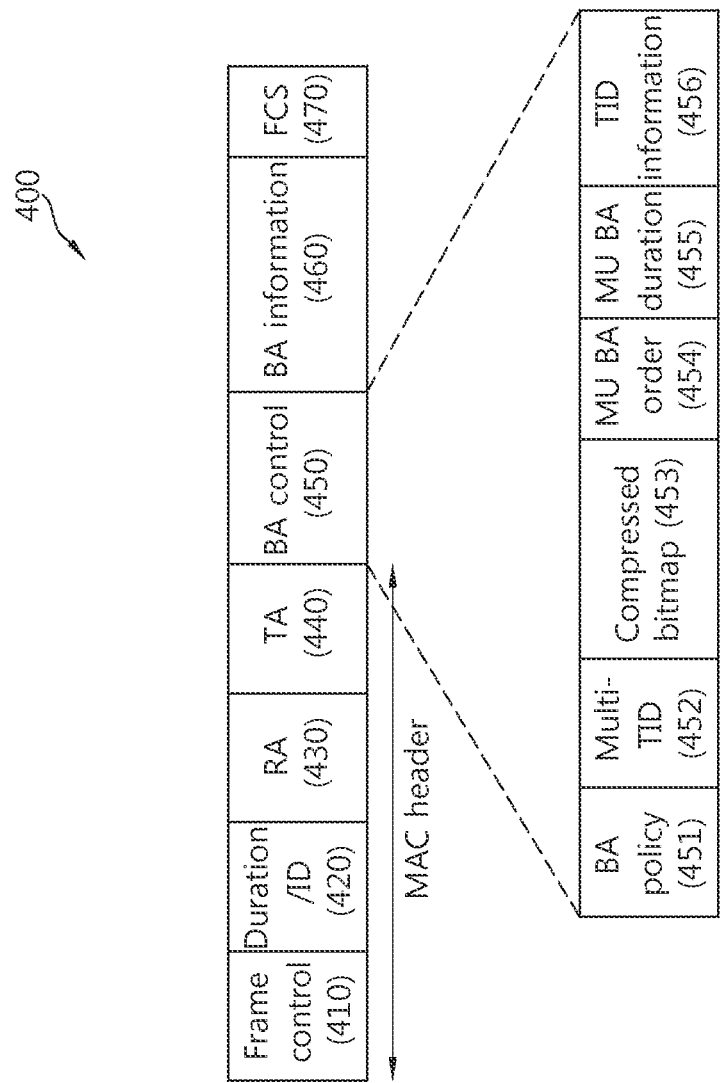
FIG. 4 is a block diagram showing an example of an MU block ACK frame in accordance with an embodiment of the present invention.

FIG. 4 is a block diagram showing an example of an MU block ACK frame in accordance with an embodiment of the present invention.

Referring to FIG. 4, the MU block ACK frame 400 includes an MAC header, a Block ACK (BA) control field 450, a BA information field 460, and a Frame Check Sequence (FCS) field 470.

The MAC header includes a frame control field 410, a duration/ID field 420, a Receiver Address (RA) field 430, and a Transmitter Address (TA) field 440.

The RA field 430 may be set as the TA of a block ACK request or the TA of a Quality of Service (QoS) data frame that has requested block ACK. The TA field 440 may be set as the address of an STA that transmits the MU block ACK frame 400.

The BA control field 450 includes a BA policy subfield 451, a multi-TID subfield 452, a compressed bitmap subfield 453, an MU BA order subfield 454, an MU BA duration subfield 455, and a Traffic Identifier (TID) information subfield 456.

The BA policy subfield 451 is a subfield indicating whether instant ACK information about the transmission of a data frame is requested or not, and it may have a length of 1 bit. For example, if the value of the field is '0', instant block ACK transmission is requested. If the value of the field is '1', block ACK transmission is not requested.

Each of the multi-TID subfield 452 and the compressed bitmap subfield 453 may have a length of 1 bit, and the type of block ACK frame may be indicated depending on the setting of the two subfields. The type of block ACK frame may include a basic block ACK frame, a compressed block ACK frame, a multi-TID block ACK frame, and the proposed MU block ACK frame. The basic BA frame, the compressed BA frame, and the multi-TID BA frame are frame formats defined in the IEEE 802.11n/D11.0 standards.

Table 1 shows an example of the setting values of the multi-TID subfield 452 and the compressed bitmap subfield 453 and the type of block ACK frame indicated by the setting values.

| MULTI-TID SUBFIELD | COMPRESSED BITMAP SUBFIELD | TYPE OF BLOCK ACK FRAME |
|---|---|---|
| 0 | 0 | Basic block ACK |
| 0 | 1 | Compressed block ACK |
| 1 | 0 | MU block ACK |
| 1 | 1 | Multi-TID block ACK |

The MU BA order subfield 454 includes information indicating order of ACKs or BA for data frames transmitted by a plurality of STAs which have participated in UL MU-MIMO transmission and transmitted the data frames to an AP. As described above, if each STA previously knows block ACK order information corresponding to its own transmission of a data frame in the MU block ACK frame, the MU block ACK order subfield 454 may be omitted.

The MU BA duration subfield 455 includes information about the start point or end point of block ACK for each of a plurality of STAs. An STA that has received the MU block ACK frame 400 can know the size of block ACK for each of STAs, paired in UL MU-MIMO transmission, through the MU BA duration subfield 455.

The BA information field 460 includes a BA start sequence control subfield and a BA bitmap subfield. The BA start sequence control subfield includes BA start sequence control for each STA, and the BA bitmap subfield includes a BA bitmap for each STA.

Figure 5:
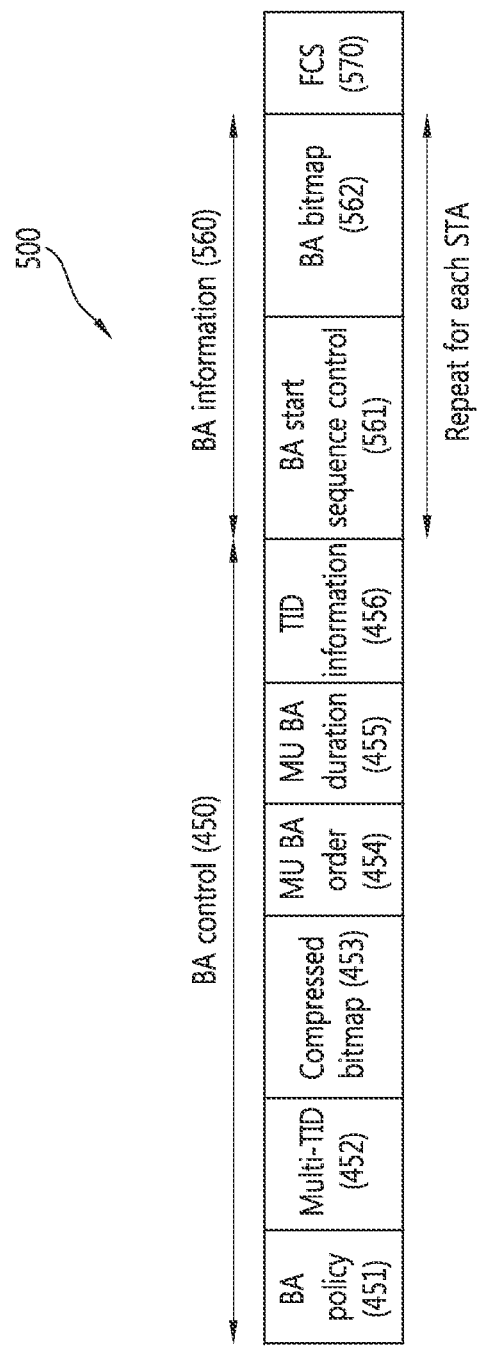
FIG. 5 is a block diagram showing an example of an MU block ACK frame in accordance with another embodiment of the present invention.

FIG. 5 is a block diagram showing an example of an MU block ACK frame in accordance with another embodiment of the present invention. As compared with the embodiment of FIG. 4, the BA information field 560 includes a BA start sequence control subfield 561 for each STA and a BA bitmap subfield 562 for each STA. The BA start sequence control subfield 561 and the BA bitmap subfield 562 are repeated for each STA.

In the MU block ACK frame 400 of FIG. 4, the BA bitmap subfields of all STAs are disposed after the BA start sequence control subfields of all the STAs. In contrast, in the MU block ACK frame 500 of FIG. 5, the BA start sequence control and BA bitmap subfields of a second STA are disposed after the BA start sequence control and BA bitmap subfields of a first STA.

If an MU block ACK frame supports multi-TID, the BA information field may further include a Per TID information subfield (not shown) including information about each of a plurality of TIDs.

Figure 6:
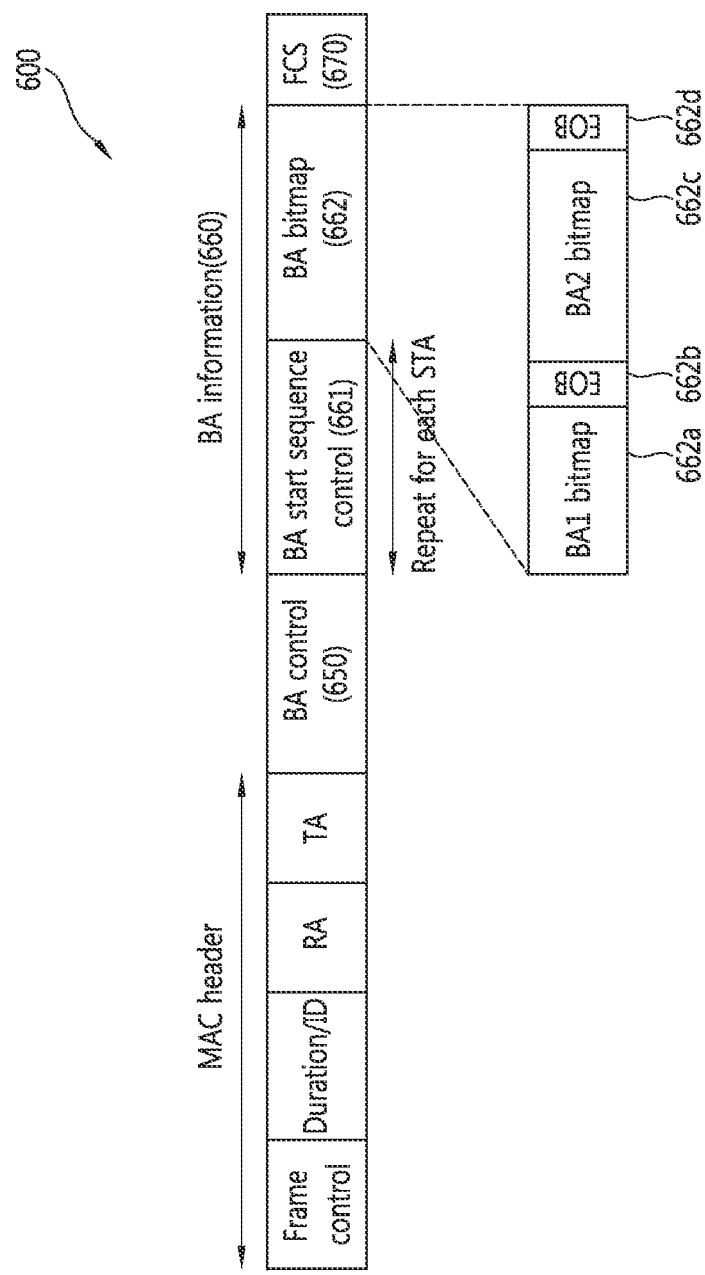
FIG. 6 is a block diagram showing an example of an MU block ACK frame in accordance with yet another embodiment of the present invention.

FIG. 6 is a block diagram showing an example of an MU block ACK frame in accordance with yet another embodiment of the present invention. In this MU block ACK frame, in order to distinguish the BA bitmaps of STAs from each other, a delimiter that distinguishes two BA bitmap from each other or a finalizer that informs the end point of a previous BA bitmap is placed between the BA bitmaps of the respective STAs.

Referring to FIG. 6, the BA information field 660 of the MU block ACK frame 600 includes a BA start sequence control field 661 and a BA bitmap field 662. In the BA start sequence control field 661, the BA start sequence control of each STA is repeated. The BA bitmap field 662 includes a BA bitmap1 662a for a first STA and a BA bitmap2 662c for a second STA. An End Of BA (EOB) informing the end of a relevant BA bitmap is added to the last of each BA bitmap within the BA bitmap field 662. That is, an EOB 662b is placed behind the BA bitmap1 662a, and an EOB 662d is placed behind the BA bitmap2 662c.

The number of BA bitmaps included in the BA bitmap field 662 is only illustrative, but not limited. Furthermore, the EOB may not be added to the last BA bitmap. For example, the EOB 662d next to the BA bitmap 2 662c may be omitted.

The EOB may be usefully used even when the reception of all data frames of a specific STA is failed. If the reception of all the data frames is failed, only the EOB may be included in the BA information field 660 without the BA bitmap of the specific STA. The unnecessary operation of an STA can be prevented because the BA bitmap has nothing meaning.

In accordance with the above-described embodiments, STAs determine that their block ACKs are placed where from a block ACK order. The block ACK order is information known to the STAs along with the MU block ACK frame or before with the MU block ACK frame.

The formats of MU block ACK frames configured irrespective of the block ACK order are described below.

FIG. 7 is a block diagram showing an example of a BA control field of the MU block ACK frame in accordance with an embodiment of the present invention.

The BA control field 750 includes a BA policy subfield 751, a multi-TID subfield 752, a compressed bitmap subfield 753, an MU subfield 754, and an MU number subfield 755.

The BA policy subfield 751, the multi-TID subfield 752, and the compressed bitmap subfield 753 are the same as the BA policy subfield 451, the multi-TID subfield 452, and the compressed bitmap subfield 453 of FIG. 4.

The MU subfield 754 indicates that it is MU block ACK. If the MU block ACK frame is indicated by the setting values of the multi-TID subfield 752 and the compressed bitmap subfield 753 as in Table 1, the MU subfield 754 may be omitted.

The MU number subfield 755 may indicate the number of STAs included as the block ACK of a BA information field. The MU number subfield 755 may indicate how many STAs are paired in order to support MU-MIMO.

Figure 8:
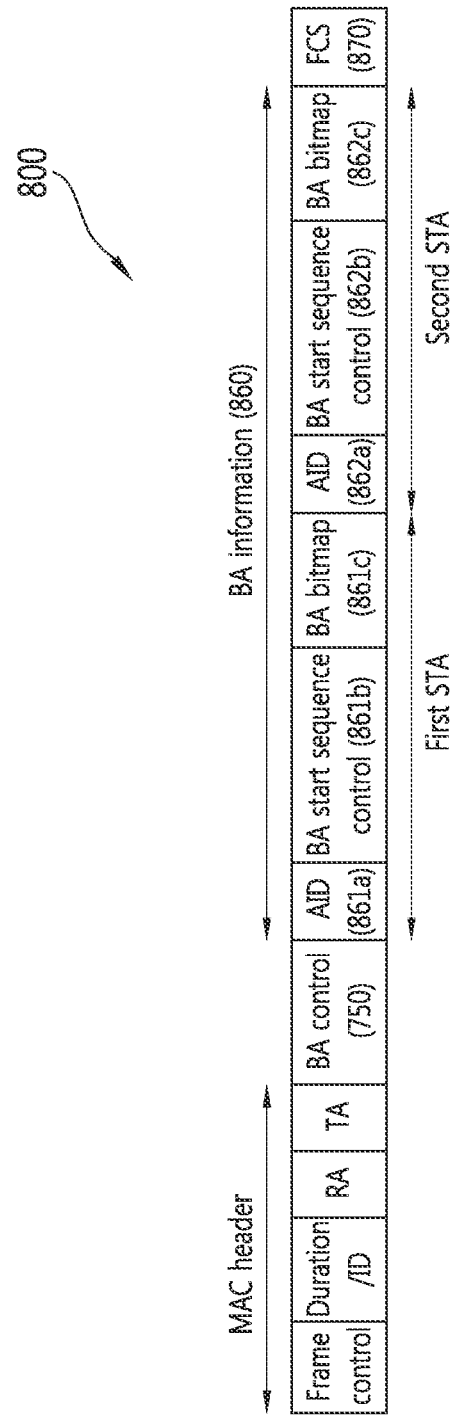
FIG. 8 is a block diagram showing an example of an MU block ACK frame in accordance with an embodiment of the present invention.

FIG. 8 is a block diagram showing an example of an MU block ACK frame in accordance with an embodiment of the present invention.

The MU block ACK frame 800 includes an MAC header, a BA control field 750, a BA information field 860, and an FCS field 870. Here, the BA control field 750 may be identical with the BA control field of FIG. 7.

The BA information field 860 includes the first BA information of a first STA and the second BA information of a second STA. The BA information includes an Association Identifier (AID), BA start sequence control, and a BA bitmap.

The AID is an identifier indicating an STA corresponding to the BA bitmap and/or the BA start sequence control. The AID may be the MAC address of an STA, and it may have various forms in order to distinguish STA from each other.

More particularly, the first BA information includes the AID 861a of a first STA, the BA start sequence control 861b of the first STA, and the BA bitmap 861c of the first STA. The second BA information includes the AID 862a of a second STA, the BA start sequence control 862b of the second STA, and the BA bitmap 862c of the second STA.

In this BA information field 860, pieces of BA information about two STAs are illustrated, but the number of STAs is not limited. The BA information field 860 may include BA information about at least one STA.

An STA that has received the MU block ACK frame 800 may obtain BA start sequence control and a BA bitmap that corresponds to an AID indicating the STA.

Meanwhile, the format of the MU block ACK frame may be changed depending on whether the TID information subfield can be included in the BA control field for an STA that supports multi-TID.

Figure 9:
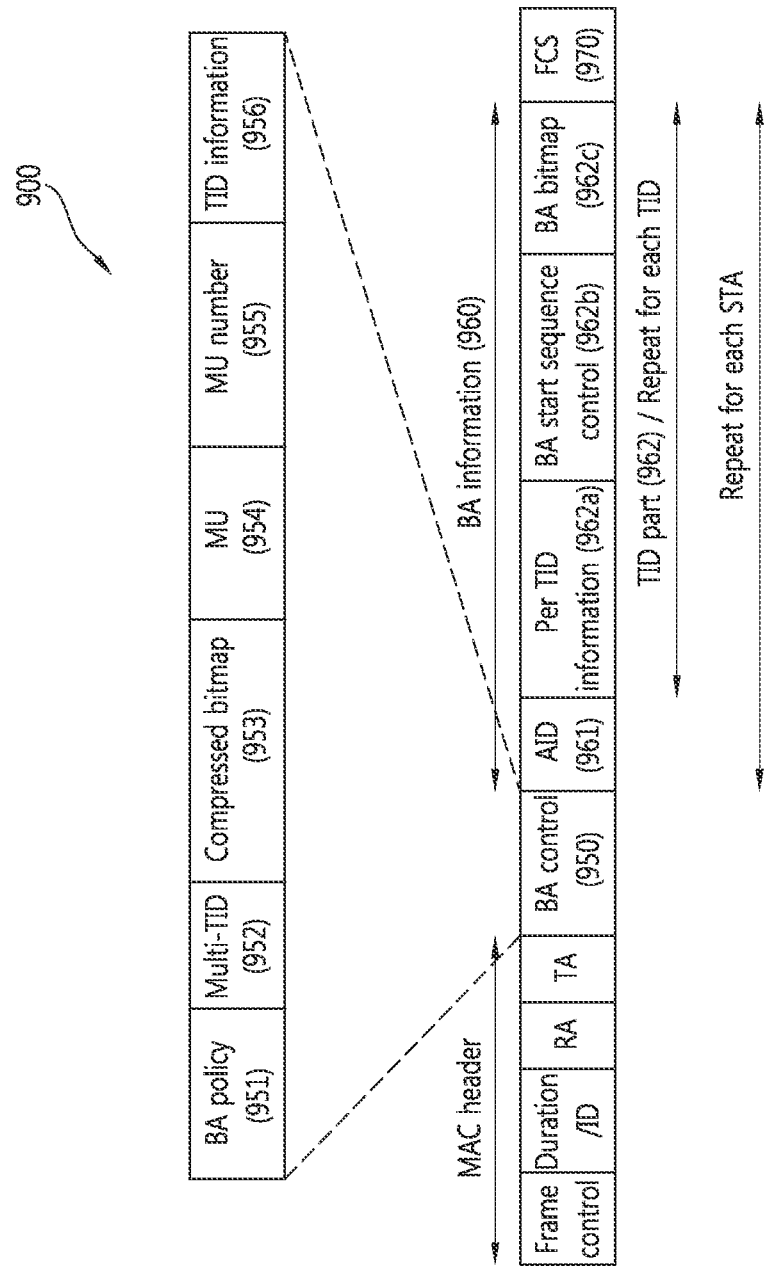
FIG. 9 is a block diagram showing an example of an MU block ACK frame in accordance with an embodiment of the present invention.

FIG. 9 is a block diagram showing an example of an MU block ACK frame in accordance with an embodiment of the present invention.

Referring to FIG. 9, the MU block ACK frame 900 includes an MAC header, a BA control field 950, a BA information field 960, and an FCS field 970.

The BA control field 950 includes a BA policy subfield 951, a multi-TID subfield 952, a compressed bitmap subfield 953, an MU subfield 954, an MU number subfield 955, and a TID information subfield 956. As compared with the BA control field 750 of FIG. 7, the BA control field 950 further includes a TID information subfield 956. The TID information subfield 956 is repeated by the number of STAs indicated by the MU number subfield 955.

The BA information field 960 includes an AID subfield 961 and a TID part 962 for each STA. That is, the AID 961 and the TID part 962 are repeated by the number of STAs indicated in the MU number subfield 955.

The TID part 962 includes a Per TID information 962a, a BA start sequence control 962b, and a BA bitmap 962c. The TID part 962 is repeated based on the setting value of the TID information subfield 956 corresponding to each STA.

Figure 10:
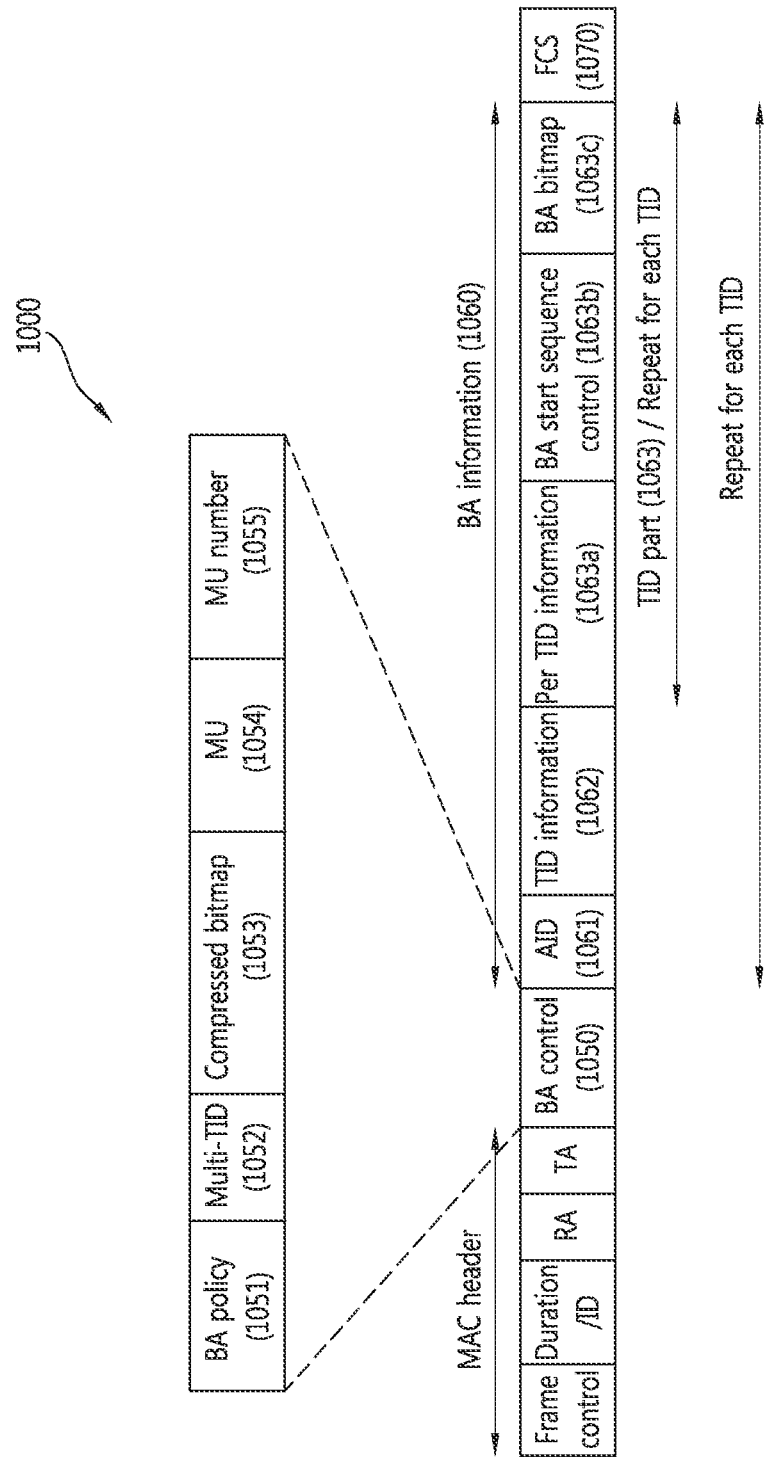
FIG. 10 is a block diagram showing an example of an MU block ACK frame in accordance with another embodiment of the present invention.

FIG. 10 is a block diagram showing an example of an MU block ACK frame in accordance with another embodiment of the present invention. As compared with the embodiment of FIG. 9, a TID information subfield 1062 is not included in a BA control field 1050, but is included in a BA information field 1060.

The BA information field 1060 includes an AID subfield 1061 for each STA, a TID information subfield 1062, and a TID part 1063. The AID subfield 1061, the TID information subfield 1062, and the TID part 1063 are repeated by the number of STAs indicated in an MU number subfield 1055. The TID part 1063 is repeated depending on the setting value of the TID information subfield 1062.

In the embodiments of FIGS. 4 to 10, the length of the BA information field of the MU block ACK frame may be varied depending on the number of STAs paired in an AP. If a maximum number of STAs capable of transmitting data through UL MU-MIMO is limited, however, the length of the BA information field may be fixed.

An AP may transmit the MU block ACK frame to a plurality of STAs at the same time. The MU block ACK frame may be broadcasted or may be unicasted using MU-MIMO.

Figure 11:
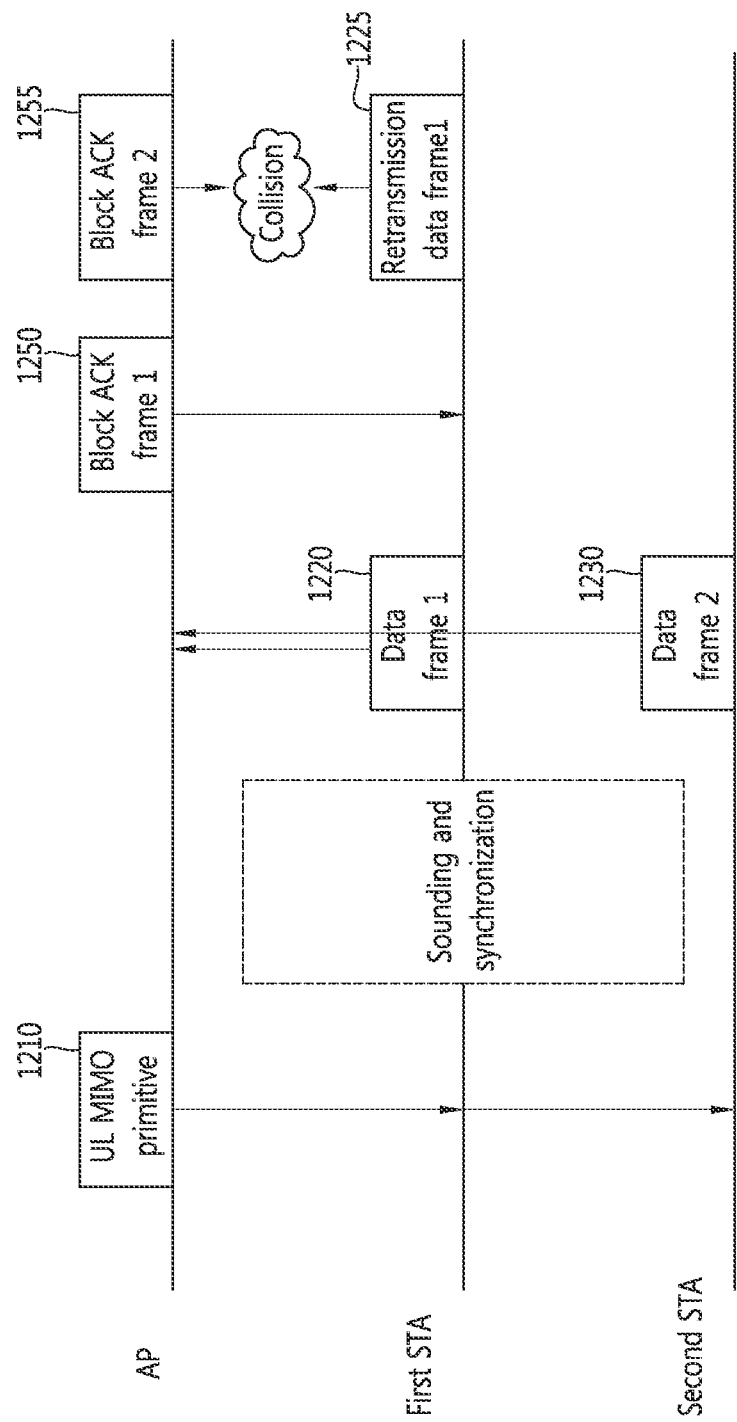
FIG. 11 shows a problem according to block ACK transmission.

FIG. 11 shows a problem according to block ACK transmission.

An AP transmits an UL MU-MIMO primitive 1210 to a first STA and a second STA. The first STA and the second STA, together with the AP perform sounding and synchronization.

By using UL-MIMO, the first STA transmits a data frame1 1220 to the AP and the second STA transmits a data frame2 1230 to the AP.

The AP transmits a block ACK frame1 1250 for the first STA to the first STA. Next, the AP transmits a block ACK frame2 1255 for the second STA to the second STA. That is, as in the existing structure, a block ACK frame for each STA is separately transmitted.

After a lapse of some time, the STA that has received the block ACK retransmits the data frame. As a result, the data frame 1 1225 retransmitted by the first STA may collide against the block ACK frame2 1255 transmitted by the AP.

Accordingly, a collision between the transmission of block ACK and the retransmission of a frame to another STA under an MU-MIMO environment may need to be taken into consideration.

Figure 12:
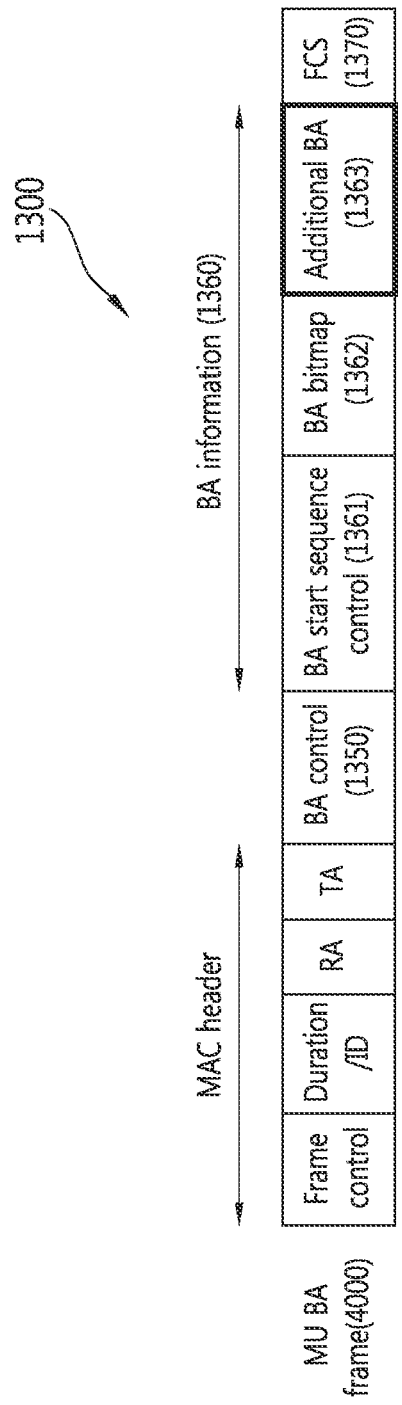
FIG. 12 is a block diagram showing an example of a block ACK frame in accordance with an embodiment of the present invention.

FIG. 12 is a block diagram showing an example of a block ACK frame in accordance with an embodiment of the present invention. The MU block ACK frame 1300 includes an MAC header, a BA control field 1350, a BA information field 1360, and an FCS field 1370.

An additional BA field 1363 is included in the BA information field 1360. The additional BA field 1363 indicates whether or not subsequent block ACK toward another STA is further transmitted to a relevant STA.

A first STA that has checked that additional block ACK (e.g., the lock ACK frame2 1255) is transmitted through the additional BA field 1363 may defer retransmission or start a new collision resolution procedure. Accordingly, a collision between block ACK transmission and retransmission frame can be prevented.

The positions of the additional BA field 1363 is not limited. The additional BA field 1363 may be included in the MAC header or the BA control field 1350.

The additional BA field 1363 is a filed that may be added in the existing block ACK frame. Furthermore, the additional BA field 1363 may also be added to the MU block ACK frame according to the embodiments of FIGS. 4 to 10.

Figure 13:
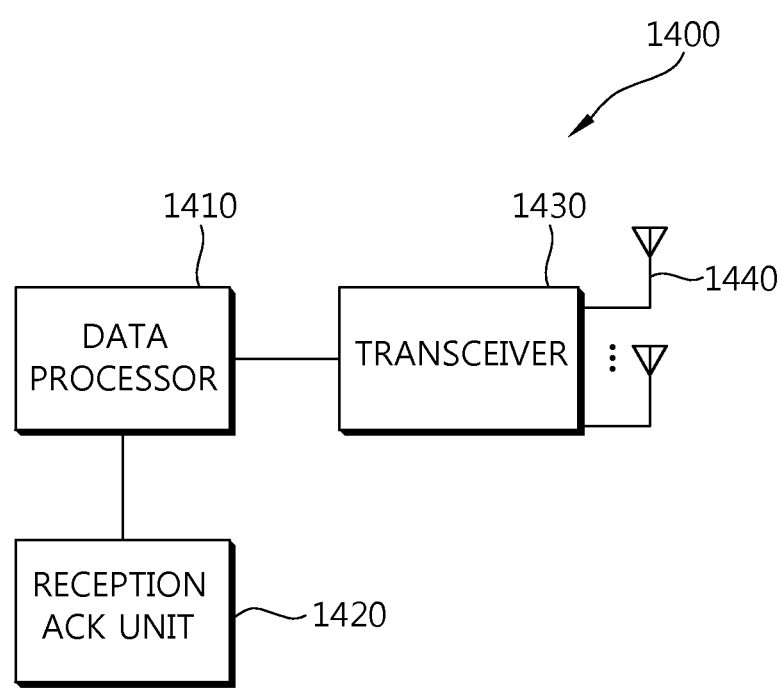
FIG. 13 shows a wireless apparatus in which the embodiments of the present invention are implemented.

FIG. 13 shows a wireless apparatus in which the embodiments of the present invention are implemented. The wireless apparatus may be a part of an STA or a part of an AP.

The wireless apparatus 1400 includes a data processor 1410, a reception ACK unit 1420, a transceiver 1430, and a plurality of antennas 1440.

The data processor 1410 processes data frames received from a plurality of STAs. The reception ACK unit 1420 generates a block ACK frame, that is, reception ACK for the data frames. The reception ACK unit 1420 may configure the MU block ACK frame according to the embodiments of FIGS. 4 to 10 and/or the block ACK frame of FIG. 12. The transceiver 1430 receives data frames and transmits block ACK frames through the plurality of antennas 1440.

The functions of the data processor 1410 and the reception ACK unit 1420 may be embodied using a processor (not shown). The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. When the embodiment is embodied in software, the above-described scheme may be embodied by using a module (process or function) that performs the above function. The module may be stored in the memory and executed by the processor. The memory 52, 62 may be placed inside or outside the processor 51, 61 and connected to the processor 51, 61 using a variety of well-known means.

The above embodiments include various aspects of examples. Although all possible combinations for describing the various aspects may not be described, those skilled in the art may appreciate that other combinations are possible. Accordingly, the present invention should be construed as including all other replacements, modifications, and changes which fall within the scope of the claims.

What is claimed is:

1. A method of transmitting acknowledgement (ACK) performed by an Access Point (AP) in a Wireless Local Area Network (WLAN), the method comprising:

transmitting a control frame used for uplink multi-user Multiple-Input Multiple-Output (UL MU-MIMO) transmission, wherein the control frame indicates a plurality of stations (STAs) participating in the UL MU-MIMO transmission and indicates a time duration for the UL MU-MIMO transmission;

in response to the control frame, receiving a plurality of response frames from the plurality of STAs, wherein the plurality of response frames are simultaneously received by the AP during the time duration; and transmitting a single frame including a Multi-User (MU) ACK frame for the plurality of response frames to the plurality of STAs, wherein the MU ACK frame comprises a Medium Access Control (MAC) header followed by a Block ACK (BA) control field followed by a plurality of BA information fields, wherein the MAC header includes a frame control field, a duration/ID field, a receiver address (RA) field, and a transmitter address (TA) field which are used for the MU ACK frame, wherein the BA control field is common to the plurality of STAs, and the BA information fields are corresponding to the plurality of STAs, respectively, wherein the BA control field includes an ACK type field indicating that the MU ACK frame is used for the plurality of STAs, wherein each BA information field includes an association ID (AID) field indicating a corresponding STA, a traffic ID (TID) field used for the corresponding STA, and a BA bitmap field indicating at least one ACK for a corresponding response frame of the corresponding STA.

2. The method of claim 1, wherein
the BA control field comprises a BA policy subfield indicating an ACK policy of the MU ACK frame.

3. The method of claim 2, wherein the BA control field further comprises
an MU BA duration indicating a size of each of the plurality of BA information fields.

4. The method of claim 2, wherein the BA control field further comprises an MU number field indicating a number of the plurality of STAs.

5. An access point (AP) in a Wireless Local Area Network (WLAN), comprising a transceiver transmitting a control frame used for uplink multi-user Multiple-Input Multiple-Output (UL MU-MIMO) transmission, wherein the control frame indicates a plurality of stations (STAs) participating in the UL MU-MIMO transmission and indicates a time duration for the UL MU-MIMO transmission, receiving a plurality of response frames from the plurality of STAs in response to the control frame, wherein the plurality of response frames are simultaneously received by the AP during the time duration, and transmitting a single frame including a Multi-User (MU) ACK frame for the plurality of response frames to the plurality of STAs; and a data processor processing the plurality of response frames and controlling the transceiver, wherein the MU ACK frame comprises a Medium Access Control (MAC) header followed by a Block ACK (BA) control field followed by a plurality of BA information fields, wherein the MAC header includes a frame control field, a duration/ID field, a receiver address (RA) field, and a transmitter address (TA) field which are used for the MU ACK frame, wherein the BA control field is common to the plurality of STAs, and the BA information fields are corresponding to the plurality of STAs, respectively, wherein the BA control field includes an ACK type field indicating that the MU ACK frame is used for the plurality of STAs, wherein each BA information field includes an association ID (AID) field indicating a corresponding STA, a traffic ID (TID) field used for the corresponding STA, and a BA bitmap field indicating at least one ACK for a corresponding response frame of the corresponding STA.

6. The AP of claim 5, wherein the BA control field comprises a BA policy subfield indicating an ACK policy of the MU ACK frame.

7. The AP of claim 6, wherein the BA control field further comprises an MU BA duration indicating a size of each of the plurality of BA information fields.

8. The AP of claim 6, wherein the BA control field further comprises an MU number field indicating a number of the plurality of STAs.

* * * * *